Patented May 5, 1942

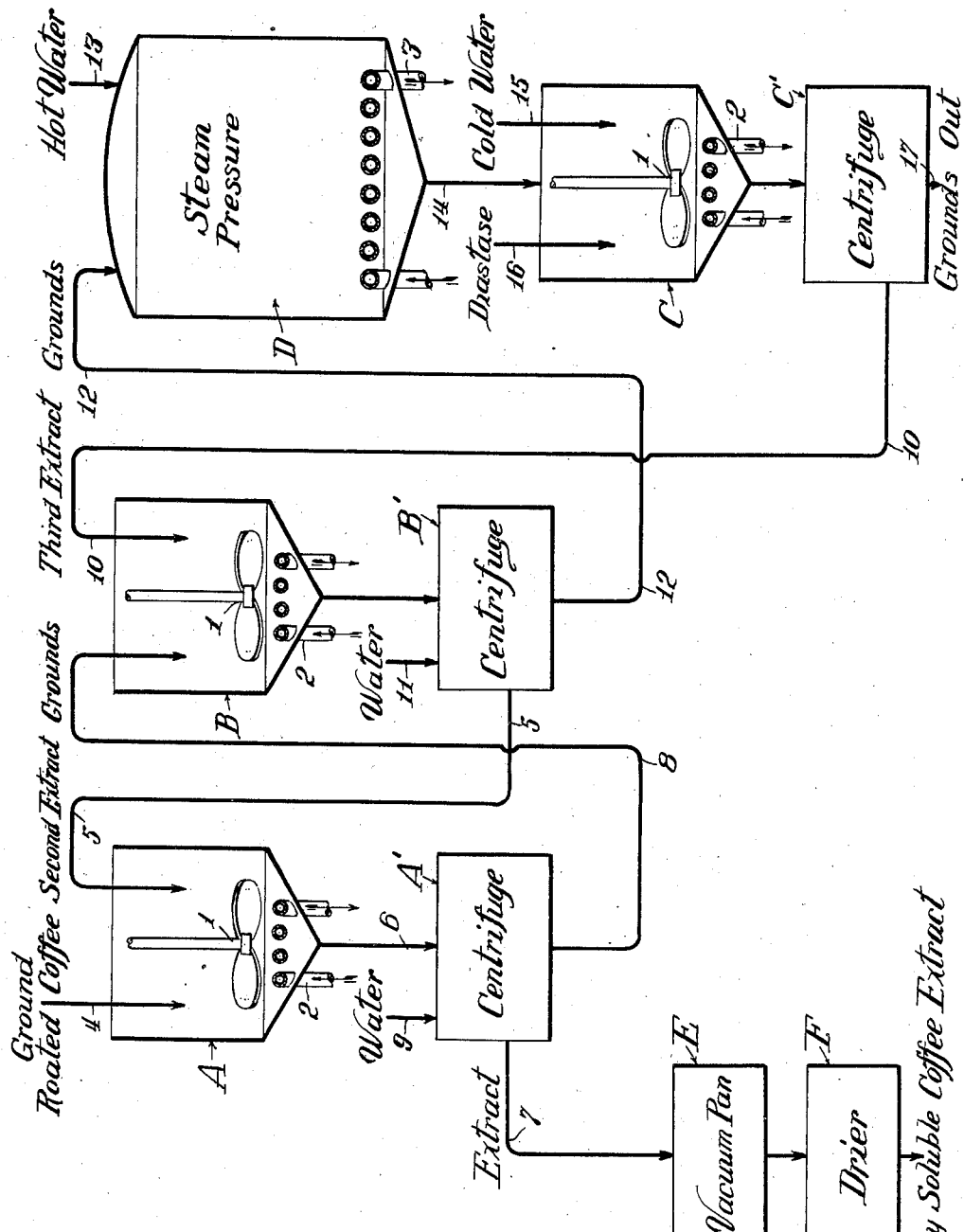

2,282,138

UNITED STATES PATENT OFFICE 2,282,138

PROCESS FOR THE PRODUCTION OF SOLUBLE COFFEE EXTRACT

John L. Kellogg, Chicago, Ill., assignor to Helen L. Kellogg, Chicago, Ill.

Application October 25, 1940, Serial No. 362,819

9 Claims. (Cl. 99—71)

This invention relates to the production of dry soluble coffee extract, known sometimes as instant coffee because the beverage may be made by merely adding water, hot or cold, to the extract, and to similar products as decaffeinized coffee extract and coffee substitutes; and the primary object of the invention is to provide certain modifications of the process described in the application of the applicant, Serial No. 338,876, filed June 5, 1940, for "Process for production of coffee extract" (for which application Serial No. 412,898, filed September 21, 1941, has been substituted), in which process the coffee material is treated with a converting enzyme, preferably taka diastase, an enzyme derived from the fungus species Eurotium oryzae (United States patent to Takamine, et al., No. 1,391,219, September 2, 1921), by means of which modifications the flavor and aroma of the beverage made from the extract is improved, so that the beverage will have true coffee flavor and aroma, and the yield of extractives will be considerably increased, making possible the production of the extract at reduced cost.

In accordance with the present invention (as is preferred in the process of the aforesaid application) the coffee material is given two or more extractions and the extract of a later operation used as an extracting vehicle on the coffee material in an earlier stage of the operation; the extracting process, therefore, being based upon the counter-current principle. According to the present improved process the grounds used in one of the later extracting operations, for example in a third and last operation, are first cooked, preferably under relatively high steam pressure, 15 pounds per square inch, for example, and after the material is cooled, it is subjected to an extracting operation in the presence of the converting enzyme. The cooking of the grounds at high temperature softens and loosens the fibres, and other relatively dense constituents of the material, thereby facilitating the extraction operation which follows, so that the yield of extractives is increased very materially and the flavor and aroma of the beverage improved due to the inclusion in the extract of coffee ingredients not extracted, or capable of being extracted, except for this cooking operation, at the low temperatures required in order that the converting enzymes may function within their optimum temperature range. By this process, in which all extractions, particularly the first extractions are carried out at relatively low temperatures, not substantially above 150° F, and preferably at 120°–130° F., the delicate aroma fractions which would be destroyed or their qualities impaired at high temperatures are removed before the material is subjected to the cooking step, whereby the final extract will contain an increased amount of extractives and, in fact, all extractives of varying character necessary to give the beverage the true coffee flavor and aroma.

The invention is illustrated in a preferred embodiment in the accompanying flow sheet diagram. It will be understood, however, that the invention is not limited to the use of the apparatus specifically as shown in the drawing, nor to the details of operation given in the following description which are to be regarded as illustrative and typical; the intention being to cover all equivalents and all modifications within the scope of the hereto appended claims.

Referring to the drawing, A, B and C indicate extracting vessels provided with agitators 1 and heating coils 2. A', B' and C' represent centrifugal machines, or other separators, associated with the extracting vessels A, B and C, respectively, for the purpose of separating the extracts from the solid coffee material. D is a steam cooker provided with a steam heating coil 3 of either the closed or perforating type. E is a vacuum pan for concentrating the extract from centrifuge A', and F a drier, preferably a vacuum drum drier, for dehydrating the concentrated extract. The following is a specific example of the operation of the process:

Example.—200 grams of finely ground, roasted coffee is introduced at 4 into the vessel A together with 800 cubic centimeters of extract (second extract) from the centrifuge B' which enters the vessel A through conduit 5. This extract will contain diastase which is first introduced into the system at the extracting vessel C, as will be described. This second extract, just referred to, is mixed with the ground, roasted coffee for one hour at a temperature between 120° and 130° F., the mixing being effected by operation of the agitator 1 and the temperature maintained by means of the steam or hot water coil 2, or other suitable means. The material is then discharged through conduit 6 into the centrifuge A' which separates the extract from the grounds, the extract (first extract) going through pipe 7 to vacuum pan E while the grounds go through conduit 8 to the second extracting vessel B. Preferably the grounds left in centrifuge A', after the liquid has been spun out, are washed with 100 c. c. of water, at a temperature of 148° F., introduced into the centrifuge at 9, the wash water from this operation forming a part of the first extract going to vacuum pan E. In this manner about 660 c. c. of extract is obtained having a density of about 4° Baumé. The extract is evaporated in vacuum pan E to 28° Baumé and then dried to dryness in the vacuum or other type of drier F. The coffee grounds derived from vessel A are mixed in vessel B with 800 c. c. of extract (third extract) from centrifuge C' which goes to vessel B through the conduit 10. The material in vessel B is maintained at a temperature of 120°–130° F. with continual agitation for about one hour. After the liquid has been spun out in centrifuge B', 100 c. c. of water at 148° F. is introduced into the centrifuge at 11; the extract (second extract) going to vessel A through pipe 5 as described.

The grounds from centrifuge B' go through conduit 12 to the closed steam cooker D where they are mixed with 400 c. c. of boiling water introduced into the cooker at 13. The material is cooked for one hour at about 15 pounds steam pressure. The cooked material is then run through conduit 14 to the third extracting vessel C and thereupon 400 c. c. of cold water is introduced into the vessel C through pipe 15, which reduces the temperature of the material to about 125° F. After the material has been cooled there is introduced into vessel C 0.015 gram of powdered Taka diastase, or other converting enzyme as indicated at 16. This mixture is agitated for about one hour at a temperature of 120° to 130° F. The material is then centrifuged in the centrifugal machine C', the grounds being discharged at 17 and the extract (third extract) going through conduit 10 to extracting vessel B.

If desired, additional diastase might be added to the system at B or A, but this does not appear to be necessary or desirable except, of course, temporarily when the process is first put into operation.

This process may be used for the treatment of other vegetable material such as cereals in the preparation of coffee-like beverages. It may also be employed for making extracts from decaffeinized coffee.

I claim:

1. In the process of making a beverage extract from vegetable matter involving subjecting the vegetable matter to repeated extractions using, as an extracting vehicle for an earlier extracting operation, an extract from a later operation, on the counter-current principle: the improvement which comprises cooking the grounds in water before extraction in the later extracting operation to facilitate the extracting process and increase the yield of extractives.

2. In the process of making a soluble coffee extract involving subjecting the coffee material to repeated extractions, using as an extracting vehicle for an earlier extracting operation an extract from a later operation, on the counter-current principle: the improvement which comprises cooking the coffee grounds in water before extraction in the later operation to facilitate the extracting process and increase the yield of extractives.

3. In the process of making a beverage extract from vegetable matter involving subjecting the vegetable matter to repeated extractions in the presence of Taka diastase, using as an extracting vehicle for an earlier extracting operation an extract from a later operation, on the counter-current principle: the improvement which comprises cooking the grounds in water before extraction in the later extracting operation to facilitate the extracting process and increase the yield of extractives.

4. In the process of making soluble coffee extract involving subjecting the coffee material to repeated extractions in the presence of a converting enzyme, using as an extracting vehicle for an earlier extracting operation an extract from a later operation, on the counter-current principle: the improvement which comprises cooking the coffee grounds in water before extraction in the later operation to facilitate the extracting process and increase the yield of extractives.

5. In the process of making soluble coffee extract involving subjecting the coffee material to repeated extractions in the presence of Taka diastase, using as an extracting vehicle for an earlier extracting operation an extract from a later operation, on the counter-current principle: the improvement which comprises cooking the coffee grounds in water before extraction in the later operation to facilitate the extracting process and increase the yield of extractives.

6. In the process of making soluble coffee extract involving subjecting the coffee material to repeated extractions in the presence of Taka diastase, using as an extracting vehicle for an earlier extracting operation an extract from a later operation, on the counter-current principle: the improvement which comprises cooking the coffee grounds in water at a pressure above atmospheric pressure before extraction of said grounds in the later extracting operation to facilitate the extracting process and increase the yield of extractives.

7. Process of making a beverage extract from vegetable matter which comprises: subjecting the material to repeated extractions, using as an extracting vehicle in an earlier operation extract derived from a later extraction; subjecting the grounds from an earlier extracting operation to a cooking operation in water at a pressure above atmosphere; and then making an extract from the cooked grounds in the presence of Taka diastase and at a temperature of 120°–130° F.

8. Process of making soluble coffee extract which comprises: subjecting the coffee material to repeated extractions using as an earlier operation extract derived from a later extraction; subjecting the grounds from an earlier extracting operation to a cooking operation in water under pressure in excess of atmospheric pressure; and then making an extract from the cooked grounds in the presence of Taka diastase and at a temperature of 120°–130° F.

9. Process of making soluble coffee extract which comprises: subjecting ground roasted coffee to three successive extracting operations with agitation and at a temperature of 120°–130° F.; using the extract from the second extracting operation as an extracting vehicle for the first extraction and using the extraction from the third extraction as an extracting vehicle for the second extraction; subjecting the grounds from the second extraction to a succeeding operation at a pressure above atmospheric pressure; cooling the material to a temperature of about 128°–125° F. by introduction thereinto of cold water, and then subjecting the cooked, cooled material to an extracting operation in the presence of Taka diastase and at a temperature of about 120°–130° F.

JOHN L. KELLOGG.